US006835492B2

United States Patent
Cho et al.

(12) United States Patent
Cho et al.

(10) Patent No.: US 6,835,492 B2
(45) Date of Patent: Dec. 28, 2004

(54) METHOD FOR FORMING LITHIUM METAL ANODE PROTECTIVE LAYER FOR LITHIUM BATTERY AND LITHIUM BATTERY HAVING SUCH PROTECTIVE LAYER

(75) Inventors: Chung-kun Cho, Suwon (KR); Do-young Seung, Seoul (KR)

(73) Assignee: Samsung SDI Co., Ltd., Kyungki-do (KR)

( * ) Notice: Subject to any disclaimer, the term of this patent is extended or adjusted under 35 U.S.C. 154(b) by 88 days.

(21) Appl. No.: 10/157,186

(22) Filed: May 30, 2002

(65) Prior Publication Data

US 2002/0182488 A1 Dec. 5, 2002

(30) Foreign Application Priority Data

May 31, 2001 (KR) .................................... 2001-30516
Sep. 29, 2001 (KR) .................................... 2001-61044

(51) Int. Cl.$^7$ ............................................... H01M 2/18
(52) U.S. Cl. ................................ 429/137; 429/131
(58) Field of Search ................................ 429/131, 137

(56) References Cited

U.S. PATENT DOCUMENTS

| | | | |
|---|---|---|---|
| 4,002,492 A | 1/1977 | Rao | 429/194 |
| 4,359,818 A | 11/1982 | Zayatz et al. | 29/623.1 |
| 4,503,088 A | 3/1985 | Fleischer | 427/58 |
| 4,934,306 A | 6/1990 | Rudolph | 118/58 |
| 5,342,710 A | 8/1994 | Koksbang | 429/192 |
| 5,961,672 A | 10/1999 | Skotheim et al. | 29/623.5 |

FOREIGN PATENT DOCUMENTS

| | | | | |
|---|---|---|---|---|
| JP | 6-196154 | 7/1994 | | |
| JP | 7-302617 | 11/1995 | | |
| JP | 07-302617 | * 11/1995 | | H01M/10/40 |

* cited by examiner

Primary Examiner—Dah-Wei Yuan
(74) Attorney, Agent, or Firm—Lee & Sterba, P.C.

(57) ABSTRACT

A method for forming a lithium anode protective layer comprises activating the surface of the lithium metal anode and forming a LiF protective layer on the activated surface of the lithium metal anode.

16 Claims, 5 Drawing Sheets

METHOD FOR FORMING LITHIUM METAL ANODE PROTECTIVE LAYER FOR LITHIUM BATTERY AND LITHIUM BATTERY HAVING SUCH PROTECTIVE LAYER

BACKGROUND OF THE INVENTION

1. Field of the Invention

The present invention relates to lithium batteries and to a method for forming a metal anode protective layer for lithium batteries. More particularly, the present invention is directed to a method of forming a LiF protective layer on a lithium metal anode surface with enhanced adhesion, improved interfacial stability due to suppression of dendrite growth on the anode surface, and with extended lifetime due to the improved energy density and cycling characteristics.

2. Description of the Related Art

As the weight of portable electronic devices, such as camcoders, mobile phones, and notebook PCs, becomes lighter and as the level of diversified functions of such portable electronic devices becomes greater, research on batteries as driving power sources is increasing. In particular, rechargeable lithium secondary batterys have received the greatest amount of attention for its fast charging rate and a weight-per-energy density that is three times higher than conventional lead storage batteries, nickel-cadmium batteries, nickel-hydrogen batteries, and nickel-zinc batteries.

When the anode of a lithium secondary battery is formed of lithium metal, the lithium metal reacts with electrolytes, water, organic solvents, or lithium salts and thus forms a solid electrolyte interphase (SEI). Such SEI leads a localized current density difference and facilitates the growth of dendrites through reactions with the lithium metal during charging. The dendrites grow larger and larger as charging-discharging cycles are repeated and eventually lead to electrical shorts between the cathode and the anode. Dendrites are mechanically unstable because of their bottle necks, and thus form a dead lithium that not only decreases the capacity of the lithium metal anode but also reduces the safety of the battery due to a high surface area of a dead lithium. As a result, battery capacity and cycling lifetime decrease with poor battery stability.

SUMMARY OF THE INVENTION

To overcome the foregoing problems, a feature of an embodiment of the present invention provides a method for forming a lithium metal anode protective layer capable of suppressing the growth of dendrites on the anode.

Another feature of an embodiment of the present invention provides a lithium metal anode employing a protective layer having enhanced interfacial stability between the lithium metal anode and the electrolyte.

Yet another feature of an embodiment of the present invention provides a lithium battery comprising a lithium metal anode having improved energy density and extended lifetime due to enhanced cycling characteristics.

In accordance with a first preferred embodiment of the present invention, there is provided a method for forming a lithium metal anode protective layer for a lithium battery having a cathode, an electrolyte, and a lithium metal anode sequentially stacked with a lithium metal anode protective layer between the electrolyte and the lithium metal anode, comprising activating the surface of the lithium metal anode and forming a LiF protective layer on the activated surface of the lithium metal anode.

The surface of the lithium metal anode is preferably activated before forming the protective layer. Preferred methods to activate the lithium metal anode includes mechanical etching, chemical etching, electrochemical etching, and plasma etching. Suitable mechanical etching methods include common etching techniques, such as polishing, grinding, and lapping as well as a scratching using a scratching device such as a Nylon brush. As the surface of the lithium metal anode is activated, impurities and solid electrolyte interphase can be removed from the lithium metal anode surface. The reactive surface area of lithium with respect to the polymeric protective layer increases so that reactivity therebetween is improved.

The LiF protective layer may be formed using a fluorine-containing polymeric layer formed on the activated surface of the lithium metal anode. The LiF protective layer may also be formed by subjecting the lithium metal anode to a fluorine-containing gas atmosphere, for example, $CF_4$ or $C_2F_6$.

While any polymer may be applied for the fluorine-containing polymeric layer so long as it contains fluorine, polytetrafluoroethylene, polyvinylidene fluoride, vinylidenefluoride (VDF)-hexafluoropropylene (HFP) copolymer, polytetrafluoroethylene-hexafluoropropylene copolymer, polychlorotrifluoroethylene, perfloroalkoxy copolymer, and fluorinated cyclic ether are preferred.

An inorganic filler such as zeolite, fumed silica, titanium dioxide, and aluminium oxide may preferably be added to improve the mechanical strength of the polymeric protective layer and thus suppress the growth of dendrites.

In accordance with a second preferred embodiment of the present invention, there is provided a method for forming a lithium metal anode protective layer for a lithium battery having a cathode, an electrolyte, and a lithium metal anode sequentially stacked with the lithium metal anode protective layer between the electrolyte and the lithium metal anode, comprising activating the surface of the lithium metal anode, forming a fluorine-containing polymeric layer on a separator and coating an inorganic filler dispersion solution on the fluorine-containing polymeric layer to form a composite layer of inorganic filler layer/fluorine-containing polymeric layer/separator, and applying the composite layer of inorganic filler layer/fluorine-containing polymeric layer/separator on the activated surface of the lithium metal anode to form the lithium metal anode protective layer on the lithium metal anode.

In this second preferred embodiment of the present invention, the surface of the lithium metal anode can be activated using the same methods described above in connection with the first preferred embodiment of the present invention. Since the inorganic filler layer is interposed between the lithium metal anode and the fluorine-containing polymeric layer, degradation of the fluorine-containing polymeric layer resulting from repeated charging-discharging cycles may be prevented, and the interfacial stability of lithium metal is improved. Alternatively, multiple inorganic filler layers may be formed through repeated depositions.

In accordance with a third preferred embodiment of the present invention, there is provided a lithium metal anode having a protective layer formed by one of the methods described above.

In accordance with yet a third preferred embodiment of the present invention, there is provided a lithium battery comprising an anode protected by a protective layer formed by one of the methods described above.

BRIEF DESCRIPTION OF THE DRAWINGS

The above features and advantages of the present invention will become more apparent by describing in detail preferred embodiments thereof with reference to the attached drawings in which.

DETAILED DESCRIPTION OF THE INVENTION

Figure 1A:
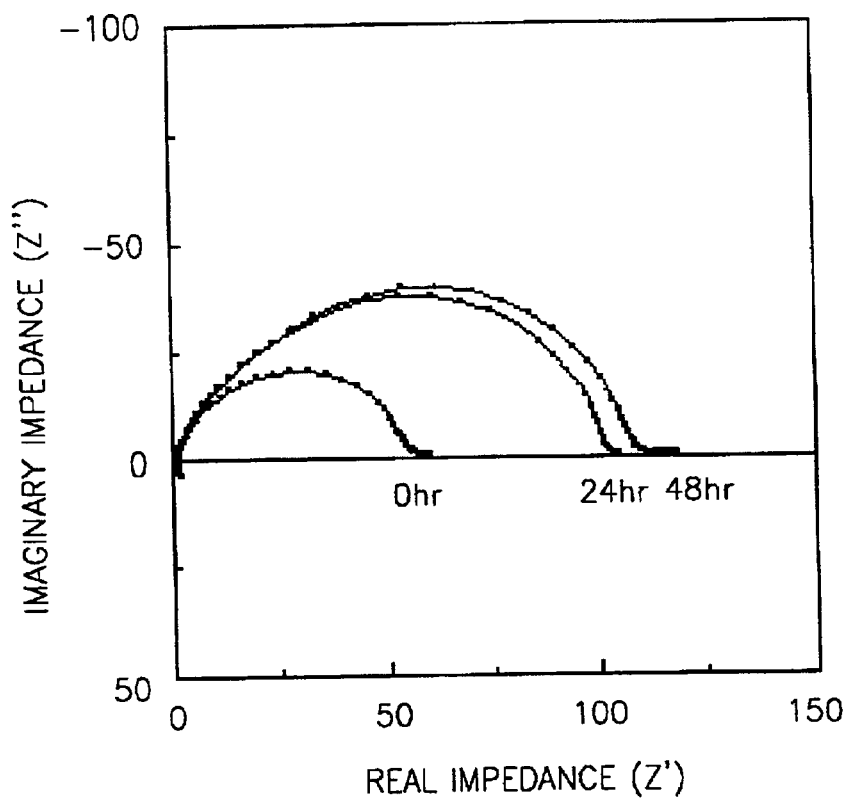
FIG. 1A illustrates a graph showing an ac impedance spectra as a function of time for a lithium battery (Li/PE/Li) without an anode protective layer, manufactured according to a Comparative Example described below.

Korean Patent Application No. 2001-30516, filed on May 31, 2001, and entitled "METHOD FOR FORMING LITHIUM METAL ANODE PROTECTIVE LAYER FOR LITHIUM BATTERY," and Korean Patent Application No. 2001-61044, filed Sep. 29, 2001, and entitled "METHOD FOR FORMING LITHIUM METAL ANODE PROTECTIVE LAYER FOR LITHIUM BATTERY," are incorporated by reference herein in their entirety.

Unlike conventional methods in which a protective layer is formed by coating a lithium metal with polymeric materials or by adding an additive to an electrolyte, a lithium metal anode protective layer according to the present invention is formed of LiF spontaneously as a result of the reaction between the lithium on an activated lithium metal surface and a polymeric layer formed of fluorine-containing polymeric resin. The LiF anode protective layer of the present invention is a reaction product and provides a uniform thickness with enhanced adhesion. The LiF anode protection layer of the present invention may also be formed by treating or subjecting the lithium metal anode surface to a fluorine-containing gas atmosphere.

To improve the reactivity between the lithium metal anode and the polymeric LiF anode protection layer, the coating may be performed under pressurized conditions. As a result, adhesion of the LiF anode protection layer to the lithium metal anode surface as well as the reactivity therebetween may be further improved. For example, a pressure ranging from 1 to 100 kgf/cm$^2$, which is normally applied for press-coating, may be applied to effect the pressurized condition.

A preferred embodiment of a method for forming a thin lithium metal anode protective layer according to the present invention now will be described in greater detail.

Initially, the lithium metal anode surface is activated. Acceptable methods for activating the anode surface include mechanical, chemical, electrochemical, and plasma etching methods, which are all well-known etching techniques. Mechanical etching methods include general polishing, grinding, and lapping techniques, as well as an etching technique using a scratching means, such as a Nylon brush. Chemical etching methods use an etching solution. In electrochemical etching methods, an electric field is applied across the anode and the counter electrode in an electrolytic solution for etching. In plasma etching methods, an etching gas such as argon (Ar) is changed into plasma containing reactive ions and radicals for reaction with the anode surface so that the anode is etched. Once the lithium metal anode surface is activated using the methods described above, a LiF protective layer is formed on the activated anode surface.

The fluorine-containing polymeric layer may be formed using a polymeric layer composition prepared by dissolving a fluorine-containing polymer in a solvent. The polymeric layer composition may be processed in film form by solvent casting, spraying, dipping, spin-coating, or molten-pressing. The resulting fluorine-containing polymeric layer is applied to the activated lithium metal anode surface to complete the formation of the LiF protective layer. In forming the polymeric layer, if the polymeric layer composition used contains a plasticizer, an additional process of extracting the plasticizer using an organic solvent such as methanol is performed.

To induce reaction between the fluorine-containing polymeric layer and activated lithium metal, pressing (or also for attachment) may be performed under pressurized conditions, preferably at pressure level ranges from about 1 to about 100 kgf/cm$^2$. If the pressure level is less than about 1 kgf/cm$^2$, reaction between the fluorine-containing polymeric layer and activated lithium metal does not occur. If the pressure level exceeds 100 kgf/cm$^2$, the lithium metal may be undesirably damaged.

After pressing, in order to further enhance the reactivity of the reaction between the lithium on an activated lithium metal surface and a polymeric layer formed of fluorine-containing polymeric resin, the resulting fluorine-containing polymeric layer applied to the activated lithium metal anode surface may be subjected to thermal treatment. The temperature of the thermal treatment, if conducted, is preferably in a range in which the characteristics of the lithium metal anode do not change. More preferably, the temperature of the thermal treatment ranges from about 30 to about 120 degrees C. If the temperature of the thermal treatment is less than about 30 degrees C., it may require too much time to induce reaction. If the temperature of the thermal treatment exceeds about 120 degrees C., the lithium metal surface of the anode may be undesirably damaged by rapid reaction.

In the present invention, the fluorine-containing polymeric layer may be formed as a single layer or a composite layer obtained by coating a separator with a fluorine-containing polymer. In the case of a single fluorine-containing polymeric layer, the thickness of the layer may preferably be from about 1 to about 100 microns, more preferably from about 10 to about 20 microns. In the case of a composite fluorine-containing polymeric layer, the total thickness of the composite layer may preferably be from about 1 to about 100 microns, more preferably from about 10 to about 20 microns. The fluorine-containing polymeric layer coated on the separator may preferably have a thickness of from about 0.1 to 10 microns, and more preferably from about 0.1 to about 2 microns. If the thickness of the single fluorine-containing polymeric layer and the composite fluorine-containing polymeric layer exceeds the stated preferred ranges, the energy density decreases. If the thickness of the fluorine-containing polymeric layer is less than the stated preferred ranges, it is difficult to uniformly coat and handle the polymer layer, with the result that it is difficult to form an effective LiF layer.

Any common separators for lithium batteries can be used in the present invention. In particular, suitable separators include any insulating sheet resin having a network structure, for example, glass fiber, polyester, polyethylene, polypropylene, polytetrafluoroethylene, and polyethylene/polypropylene composite layers.

An inorganic filler can be further incorporated into the fluorine-containing polymeric layer. The amount of inorganic filler that may be added is preferably in the range of from about 5 to about 60 parts by weight based on 100 parts by weight of the fluorine-containing polymer. If the amount of inorganic filler is less than the preferred stated range, desired characteristics may not be attainable. If the amount of inorganic filler exceeds the preferred stated range, the physical integrity of the protective layer may be comprised and may be likely to become broken.

As noted, the LiF protective layer according to the present invention may also be formed by subjecting or processing the anode surface in a fluorine-containing gas atmosphere to attain a LiF protective layer having an appropriate thickness. Suitable fluorine-containing gases include $CF_4$, $C_2F_6$, etc.

Another preferred embodiment of the method for forming a lithium metal anode protective layer according to the present invention will now be described in greater detail.

Initially, the lithium metal anode surface is activated. After formation of a fluorine-containing polymeric layer on a separator, an inorganic filler dispersion solution is coated on the fluorine-containing polymeric layer, to form a composite layer of inorganic filler layer/fluorine-containing polymeric layer/separator. Next, the composite layer of inorganic filler layer/fluorine-containing polymeric layer/separator is applied to the activated lithium metal anode surface to form a protective layer on the lithium metal anode.

The inorganic filler dispersion solution may be formed by dispersion of an inorganic filler in an organic solvent such as acetone, dimethylcarbonate, etc. The inorganic filler is at least one selected from the group consisting of zeolite, fumed silica, titanium dioxide, and aluminium oxide. The inorganic filler layer has a preferred thickness of from about 0.1 to about 0.5 microns. If the thickness of the inorganic filler layer is greater than about 0.5 microns, adhesion of the inorganic filler layer to lithium metal markedly decreases. As noted, the single fluorine-containing polymeric layer preferably has a thickness of from about 1 to about 100 microns, and more preferably from about 10 to about 20 microns, when formed as a single layer. In the case where the fluorine-containing polymeric layer is formed as a composite layer including a separator, the composite layer preferably has a total thickness of from about 1 to about 100 microns, and more preferably from about 10 to about 20 microns, and the fluorine-containing polymeric layer formed on the separator preferably has a thickness of from about 0.1 to about 10 microns, and more preferably from about 0.1 to about 2 ☞m.

To enhance the adhesion to the lithium metal anode layer, a polymeric binder such as polytetrafluoroethylene, polyvinylidene fluoride, vinylidenefluoride (VDF)-hexafluoropropylene (HFP) copolymer, polytetrafluoroethylene-hexafluoropropylene copolymer, polychlorotrifluoroethylene, perfloroalkoxy copolymer, or fluorinated cyclic ether, may be added in forming the inorganic filler layer so as to provide appropriate mechanical strength and stable interfacial properties. It is preferable that the amount of polymeric binder added is in the range of from about 30 to about 50 parts by weight based on 100 parts by weight of the organic filler. If the amount of polymeric binder exceeds this stated range, the mechanical film strength of the inorganic filler layer is undesirable.

A general method of manufacturing batteries is applied in the manufacture of a lithium battery employing a lithium metal anode protective layer according to the present invention. The lithium battery according to the present invention is not limited in shape and may be a lithium primary battery or a lithium secondary battery including a lithium ion battery and a lithium ion polymer battery.

The present invention now will be described in greater detail with reference to the following examples. The following examples are for illustrative purposes and are not intended to limit the scope of the present invention.

EXAMPLE 1

A lithium metal layer having a thickness of about 30 microns was laminated on a copper foil by pressing, and the surface of the lithium metal layer was brushed using a Nylon brush to remove impurities and the solid electrolyte interphase and to activate the surface of the lithium metal layer.

A polymeric layer to react with lithium metal was formed on the polyethyleneterephthalate film by casting a solution of 15 g of vinylidenefluoride (VDF)-hexafluoropropylene (HFP) copolymer (having the trade designation "Kynar 2801", available from ATOFINA Chemicals, Inc., 2000 Market Street in Philadelphia, Pa., 19103-3222), 20 g of dibutylphthalate, and 10 g of silica in acetone on a polyethylenetelephthalate film having a thickness of 25 microns. To enhance the ionic conductivity of the polymeric layer, the polymeric layer on the polyethylenetelephthalate film was dipped in methanol for about 1 hour to extract dibutylphthalate and then dried in a vacuum oven at 70 degrees C. for over 12 hours to form a dried single polymeric layer having a thickness of about 20 microns and having micro-pores.

Immediately after brushing the lithium metal anode surface using the Nylon brush, the polymeric layer was placed on the activated lithium metal anode surface and passed between Teflon rollers to combine together, and then left at room temperature for 24 hours.

A quaternary electrolytic solution including dioxolane, diglyme, sulfolane, and dimethoxyethane in a 50:20:10:20 ratio on a volume basis and in which 1 mol $LiCF_3SO_3$ had been dissolved was used. As a result, Li, polymeric layer, polyethylene (PE) separator, polymeric layer and Li are sequentially stacked to form a lithium battery.

EXAMPLE 2

A lithium metal layer having a thickness of about 30 microns was laminated on a copper foil by pressing, and the surface of the lithium metal layer was brushed using a Nylon brush to remove impurities and the solid electrolyte interphase and to activate the surface of the lithium metal layer.

A polymeric layer to react with lithium metal was formed as a composite layer by casting a solution of 1 g of VDF-HFP copolymer (having the trade designation "Kynar 2801") in 45 g of acetone on a polyethylene (PE) separator (available from Asahi Corp., Japan) having a thickness of about 25 microns. The composite layer of fluorine-containing polymeric layer on the separator was formed to a thickness of about 1 micron to prevent a reduction in the ionic conductivity of the composite layer and then left at room temperature to remove the remaining solvent.

After coating a mixture including 0.8 g of fumed silica and 98.2 g of acetone on the polymeric layer, the polymeric layer was vacuum dried at a temperature of 80 degrees C. to attain a composite layer of fumed silica/polymeric layer, wherein the fumed silica layer had a thickness of 0.5 microns.

Immediately after the lithium metal anode surface was brushed and activated using the Nylon brush, the composite layer of fumed silica/polymeric layer was placed on the activated lithium metal anode surface such that the fumed silica layer contacted the activated surface and then passed between Teflon rollers to combine together, and thereafter left at room temperature for 24 hours.

A quaternary electrolytic solution including dioxolane, diglyme, sulfolane, and dimethoxyethane in a 50:20:10:20 ratio on a volume basis and in which 1 mol $LiCF_3SO_3$ had been dissolved was used. As a result, Li, fumed silica layer, polymeric layer, PE separator, polymeric layer, fumed silica layer and Li are sequentially stacked to form a lithium battery.

EXAMPLE 3

A composite layer of fumed silica-dispersed polymer layer/polymeric layer was manufactured in the same manner as in Example 2, except that a fumed silica-dispersed polymeric layer having a thickness of about 0.5 microns, instead of the fumed silica layer, was formed using a mixture of 0.8 g of fumed silica, 0.3 g of VDF-HFP copolymer, and 55 g of acetone.

The fumed silica-dispersed polymeric layer was placed on and in contact with the activated lithium metal anode surface by brush and then passed through Teflon rollers to combine together, and thereafter left at room temperature for 24 hours.

A quaternary electrolyte including dioxolane, diglyme, sulfolane, and dimethoxyethane in a 50:20:10:20 ratio on a volume basis and in which 1 mol $LiCF_3SO_3$ had been dissolved was used. As a result, Li, fumed silica-dispersed polymeric layer, polymeric layer, PE separator, polymeric layer, fumed silica-dispersed polymeric layer and Li are sequentially stacked to form a lithium battery.

EXAMPLE 4

A solution of 5 g of VDF-HFP copolymer (having the trade designation "Kynar 2801") in 50 g of acetone was cast on a polyethyleneterephthalate film having a thickness of about 200 microns and then dried in a vacuum oven at 70 degrees C. for over 12 hours to form a polymeric layer having a thickness of about 2 microns. A lithium metal layer having a thickness of about 100 microns was laminated on a copper foil and passed between Teflon rollers and combined together. Then, the polymeric layer-coated polyethyleneterephthalate film was placed on the lithium metal layer such that the polymeric layer contacted the lithium metal layer and then pressed at 4 atm for 10 seconds to combine together. To accelerate reactions between the polymeric protective layer and the lithium metal, the resultant structure was heated in a vacuum oven at two different temperatures of 80 degrees C. and 130 degrees C. for 18 hours each to form a LiF protective layer. The polyethyleneterephthalate film was removed so that only the polymeric layer remained on the lithium metal layer surface. Then, the lithium metal surface coated with the polymeric layer was observed. As a result, no change was observed from the interface between the polymeric layer and the lithium metal layer that had been heated at 80 degrees C. In contrast, for the sample that had been heated at 130 degrees C., the interface between the polymeric layer and the lithium metal darkened. For a sample that has not been thermally treated, the polymeric layer was separated together as the polyethyleneterephthalate film was removed from the lithium metal layer. For both the samples thermally treated at 80 degrees C. and 130 degrees C., separation of the polymeric layer from the lithium metal layer did not occur. These results explain that thermal treatment performed after coating of the polymeric protective layer facilitates reactions between the polymeric layer and the lithium metal layer and thus enhances the adhesion therebetween.

COMPARATIVE EXAMPLE

A Li/PE/Li battery was manufactured in the same manner as in Example 1, except that no LiF protective layer was formed on the lithium metal anode surface.

Figure 1B:
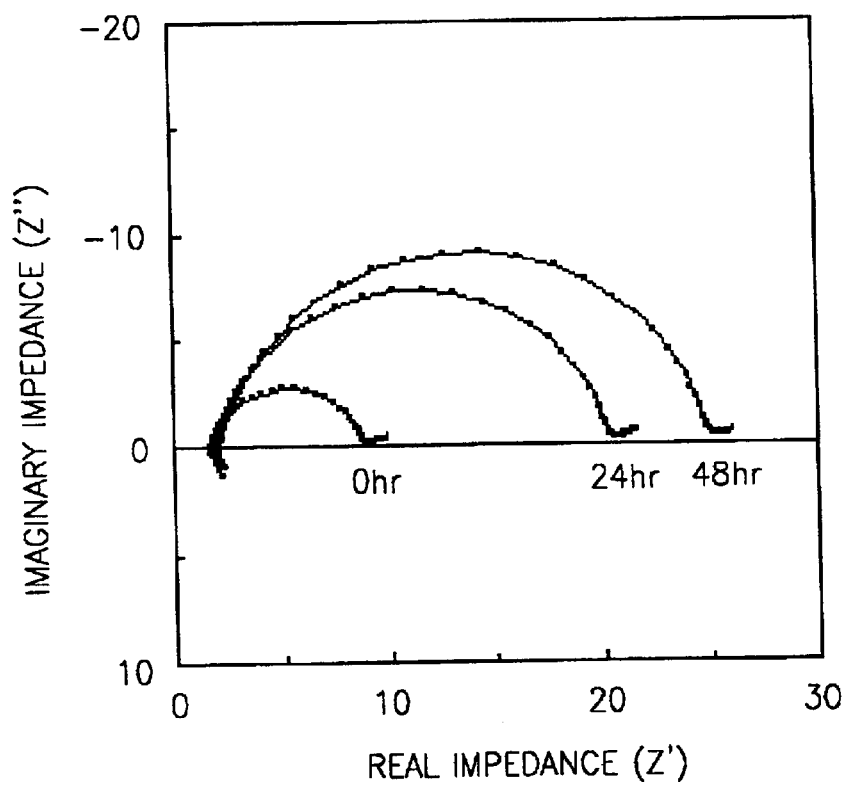
FIG. 1B illustrates a graph showing an ac impedance spectra as a function of time for a lithium battery (Li/polymeric layer/PE/polymeric layer/Li) having a protective layer, manufactured according to Example 1 of the instant invention as described below.
Figure 4A:
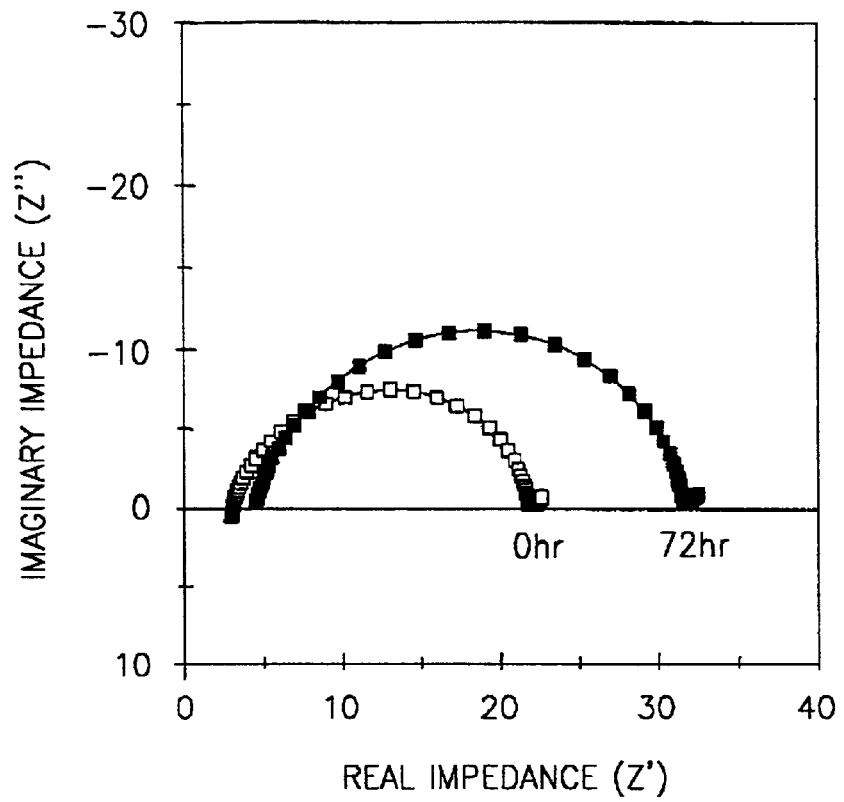
FIG. 4A illustrates a graph showing an ac impedance spectra as a function of time for a lithium battery (Li/fumed silica-dispersed polymeric layer/polymeric layer/PE/polymeric layer/fumed silica-dispersed polymeric layer/Li) having a protective layer and manufactured according to Example 3 of the present invention described below.

Variations in ac impedance over time were measured. The results are shown in FIGS. 1A and 1B. For the lithium battery (Li/PE/Li) from the Comparative Example, which has no anode protective layer, a high-resistance interfacial layer grows as a result of the chemical reaction between the lithium anode and electrolytic solution, so that the interfacial resistance markedly increases over time, as shown in FIG. 1A. The lithium battery from Example 1 and the lithium battery from Example 3 show improved interfacial stability because the interfacial resistance slightly increases over time, as shown in FIGS. 1B and 4A, respectively.

Figure 2:
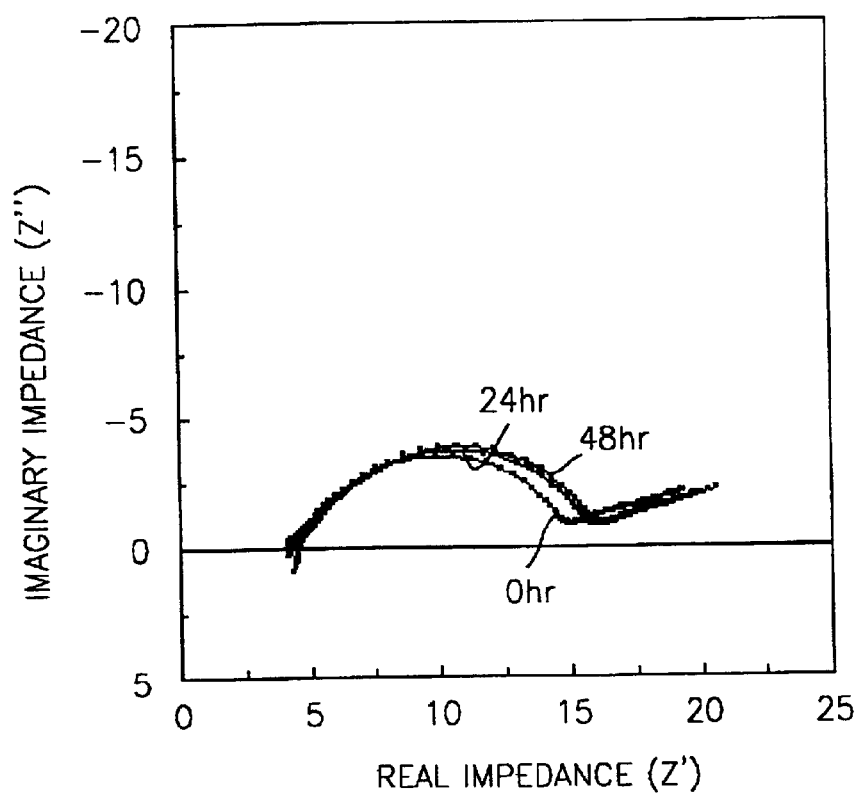
FIG. 2 illustrates a graph showing an ac impedance spectra as a function of time after 10 charging-discharging cycles for the lithium battery (Li/polymeric layer/PE/polymeric layer/Li) having the protective layer and manufactured according to Example 1 of the instant application as described below.

FIG. 2 shows variations in ac impedance for the lithium battery manufactured in Example 1 after 10 charging-discharging cycles. The charge/discharge current density was 0.5 $mA/cm^2$, and the duration of 10 charging-discharging cycles was 30 minutes. The ac impedance spectra mostly did not change over time. This result implies that the protective layer is maintained intact after the charging-discharging cycle with stable interfacial characteristics with respect to the lithium metal anode.

Figure 3A:
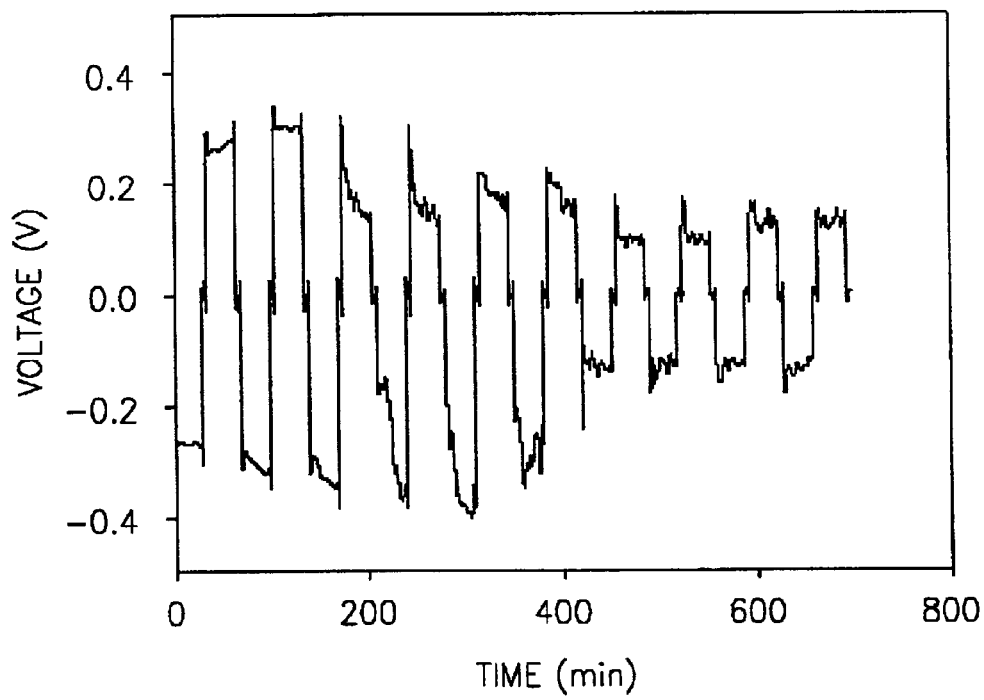
FIG. 3A illustrates a graph showing variations in charge/discharge voltage over time for the lithium battery (Li/PE/Li) without the anode protective layer, manufactured according to the Comparative Example described below.
Figure 3B:
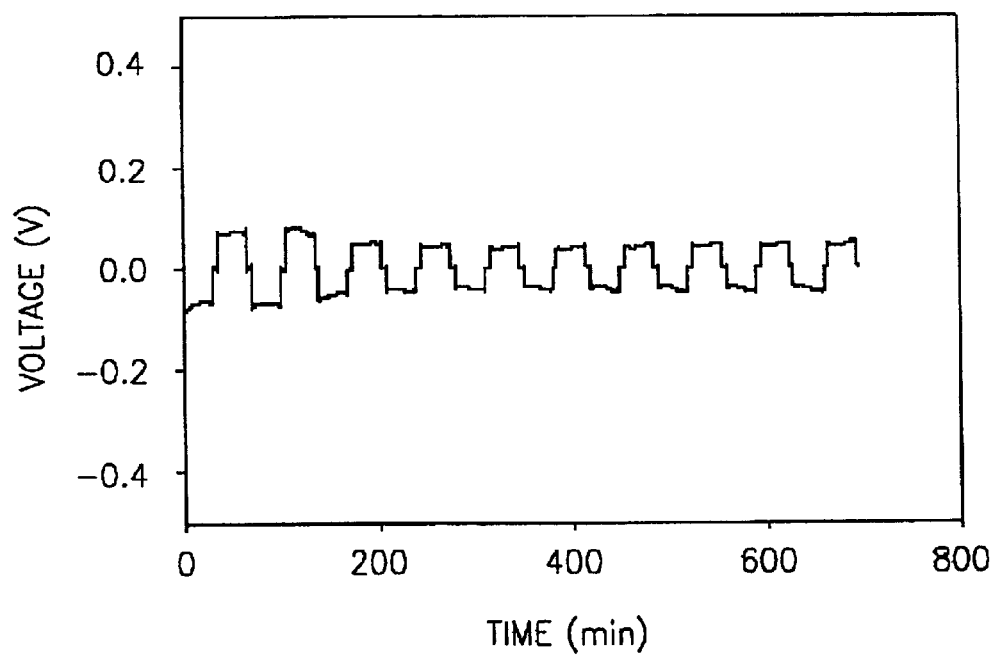
FIG. 3B illustrates a graph showing variations in charge/discharge voltage over time for the lithium battery (Li/polymeric layer/PE/polymeric layer/Li) having the protective layer and manufactured according to Example 1 of the present invention described below.
Figure 3C:
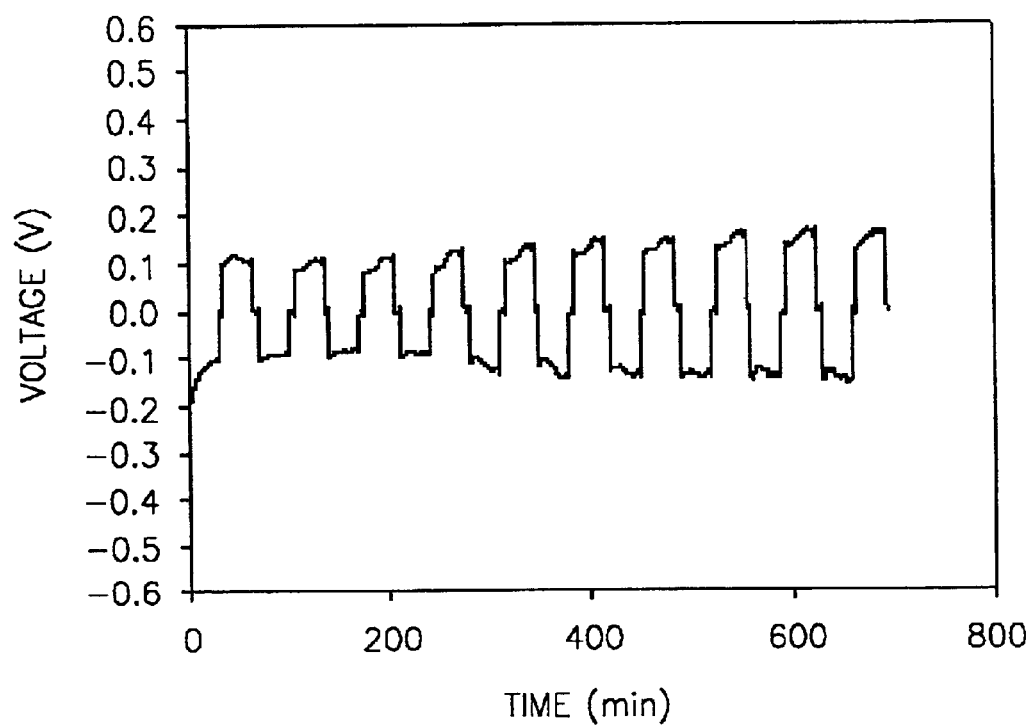
FIG. 3C illustrates a graph showing shows variations in charge/discharge voltage over time for a lithium battery (Li/fumed silica layer/polymeric layer/PE/polymeric layer/fumed silica layer/Li) having a protective layer and manufactured according to Example 2 of the present invention described below.
Figure 4B:
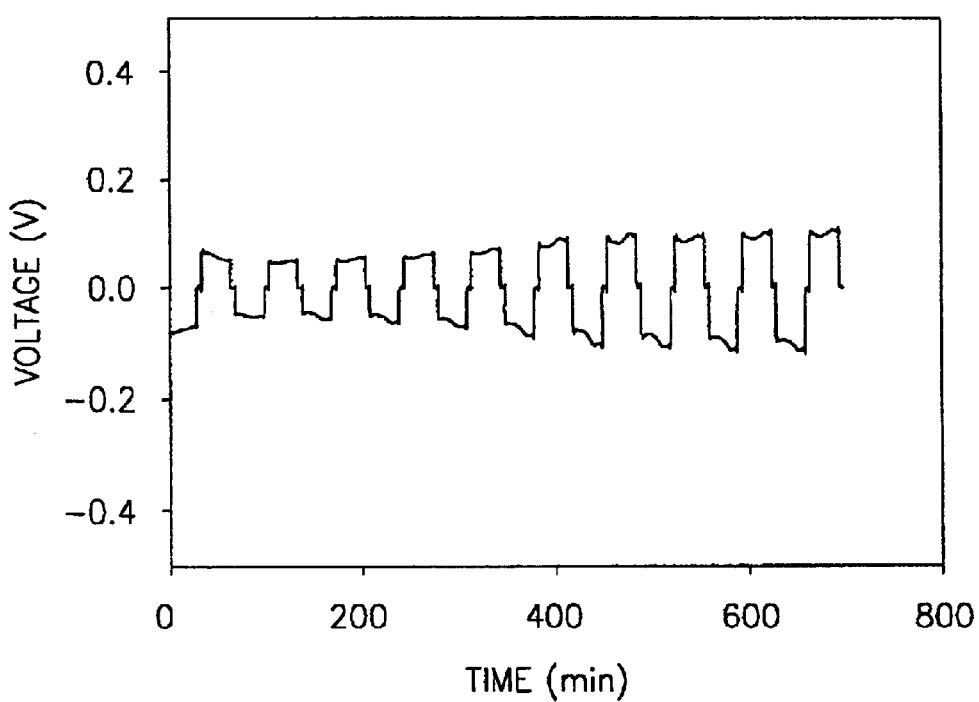
FIG. 4B illustrates a graph showing charge/discharge voltage over time for the lithium battery (Li/fumed silica-dispersed polymeric layer/polymeric layer/PE/polymeric layer/fumed silica-dispersed polymeric layer/Li) having a protective layer and manufactured according to Example 3 of the present invention described below.

FIGS. 3A through 3C and FIG. 4B show variations in charge/discharge voltage over time during 10 charging-discharging cycles. The lithium batteries from Example 1, Example 2, and Example 3 have very stable charge/discharge voltage characteristics, as shown in FIGS. 3B, 3C, and 4B, respectively. However, the lithium battery from the comparative example shows very irregular, unstable charge/discharge voltage characteristics and overvoltages, as shown in FIG. 3A.

Cycling efficiency was measured for the lithium batteries manufactured in Examples 1 and 4 according to the present invention and the lithium battery from the Comparative Example, under a constant current condition. Here, the charge/discharge current density was 0.5 mA/cm$^2$, and the duration of 10 charging-discharging cycles was 30 minutes.

The cycling efficiency was about 92% for the lithium metal anode manufactured in Example 1, about 86% for the lithium metal anode coated with the fluorine-containing polymeric layer and heated at 80 degrees C. in Example 4, and about 80% for the lithium metal anode heated at 130 degrees C. in Example 4, which are all greater than the lithium battery without the protective layer manufactured in the Comparative Example and having a cycling efficiency of 60%.

According to the present invention, a lithium metal anode protective layer of LiF is spontaneously formed as a fluorine-containing polymeric layer and is coated on and pressed against the activated surface of the lithium metal anode. The formation of the lithium metal anode protective layer according to the present invention is simple, low-cost, and provides greater adhesion, compared to conventional thin film coating methods, such as vacuum deposition, applied to form a protective layer. In addition, the product of the reaction between the fluorine-containing polymeric layer and the activated lithium metal anode is an inorganic compound, so that the problem of swelling due to the electrolytic solution may be eliminated. There are also improvements in energy density, cycling characteristics, and battery lifetime.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method for forming a lithium metal anode protective layer for a lithium battery having a cathode, an electrolyte, and a lithium metal anode sequentially stacked with the lithium metal anode protective layer between the electrolyte and the lithium metal anode, comprising:
   (A1) activating the surface of the lithium metal anode using a mechanical etching, electrochemical etching, or plasma etching method; and
   (B1) forming a LiF protective layer on the activated surface of the lithium metal anode.

2. The method as claimed in claim 1, wherein when the mechanical etching method is applied, a scratching device is used.

3. The method as claimed in claim 1, wherein in step (B1), the LiF protective layer is formed from a fluorine-containing polymeric layer formed on the activated surface of the lithium metal anode.

4. The method as claimed in claim 3, wherein in forming the fluorine-containing polymeric layer, a pressure ranging from about 1 to about 100 kgf/cm$^2$ applied.

5. The method as claimed in claim 3, wherein in forming the fluorine-containing polymeric layer, a thermal process at a temperature from about 30 to about 120 degrees C. is performed.

6. The method as claimed in claim 3, wherein the fluorine-containing polymeric layer comprises at least one selected from the group consisting of polytetrafluoroethylene, polyvinylidene fluoride, vinylidenefluoride (VDF)-hexafluoropropylene (HFP) copolymer, tetrafluoroethylene-hexafluoropropylene copolymer, polychlorotrifluoroethylene, perfloroalkoxy copolymer, and fluorinated cyclic ether.

7. The method as claimed in claim 3, wherein the fluorine-containing polymeric layer has a thickness of from about 1 to about 100 microns.

8. The method as claimed in claim 7, wherein the fluorine-containing polymeric layer has a thickness of from about 10 to about 20 microns.

9. The method as claimed in claim 3, wherein the fluorine-containing polymeric layer is formed as a single layer.

10. The method as claimed in claim 3, wherein the fluorine-containing polymeric layer is formed as a composite layer by coating a fluorine-containing polymer on a separator.

11. The method as claimed in claim 10, wherein the fluorine-containing polymeric layer formed on the separator has a thickness of from about 0.1 to about 10 microns.

12. The method as claimed in claim 11, wherein the fluorine-containing polymeric layer formed on the separator has a thickness of from about 0.1 to about 2 microns.

13. The method as claimed in claim 3, wherein an inorganic filler that is at least one selected from the group consisting of zeolite, fumed silica, titanium dioxide, and aluminium oxide is additionally incorporated into the fluorine-containing polymeric layer in an amount of from about 5 to about 60 parts by weight based on 100 parts by weight of a fluorine-containing polymeric material.

14. The method as claimed in claim 1, wherein the LiF protective layer is formed as the lithium metal anode is processed in a fluorine-containing gas atmosphere.

15. The method as claimed in claim 14, wherein the fluorine-containing gas comprises at least one selected from the group consisting of $CF_4$ and $C_2F_6$.

16. A method for forming a lithium metal anode protective layer for a lithium battery including a cathode, an electrolyte, and a lithium metal anode sequentially stacked with the lithium metal anode protective layer positioned between the electrolyte and the lithium metal anode, comprising:
   (A1) activating the surface of the lithium metal anode; and
   (B1) forming a LiF protective layer on the activated surface of the lithium metal anode,
wherein the LiF protective layer is formed as the lithium metal anode is processed in a fluorine-containing gas atmosphere comprising at one of $CF_4$ or $C_2F_6$.

* * * * *